(12) United States Patent
Richter

(10) Patent No.: US 6,293,509 B1
(45) Date of Patent: Sep. 25, 2001

(54) SUPPORT DEVICE WITH RETAINING BRACKET

(76) Inventor: Herbert Richter, Drosselweg 8, 75331 Engelbrand (DE)

( * ) Notice: Subject to any disclaimer, the term of this patent is extended or adjusted under 35 U.S.C. 154(b) by 0 days.

(21) Appl. No.: 09/519,433

(22) Filed: Mar. 6, 2000

(30) Foreign Application Priority Data

Feb. 9, 2000 (DE) .......................................... 200 02 351 U

(51) Int. Cl.⁷ .................................................... A47G 1/17
(52) U.S. Cl. ................................... 248/309.4; 248/206.5; 379/454
(58) Field of Search .............................. 248/309.4, 206.5, 248/683, 316.5; 224/562, 553, 929; 379/446, 455, 454

(56) References Cited

U.S. PATENT DOCUMENTS

| 3,472,391 | * | 10/1969 | Bolognesi | 211/65 |
| 5,630,517 | * | 5/1997 | Maznik | 211/70.6 |
| 5,703,946 | * | 12/1997 | Chen | 379/446 |
| 5,992,807 | * | 11/1999 | Tarulli | 248/206.5 |
| 6,076,790 | * | 6/2000 | Richter | 248/206.5 |
| 6,135,408 | * | 10/2000 | Richter | 248/309.4 |
| 6,149,116 | * | 11/2000 | Won | 248/309.4 |
| 6,155,523 | * | 12/2000 | Pitre | 248/206.5 |

* cited by examiner

Primary Examiner—Ramon O. Ramirez
Assistant Examiner—Gwendolyn Baxter
(74) Attorney, Agent, or Firm—Klaus J. Bach

(57) ABSTRACT

In a support device for temporarily supporting an article, particularly a cellular telephone, which includes a base body with a support plate and a magnet disposed below the support plate for retaining articles on the support plate, a pivotable bracket is mounted on the base body so as to be inwardly and outwardly pivotable and the bracket includes an arm which extends over the support plate in parallel spaced-relationship therefrom when the bracket is in the outwardly pivoted end position.

9 Claims, 1 Drawing Sheet

SUPPORT DEVICE WITH RETAINING BRACKET

BACKGROUND OF THE INVENTION

The invention relates to a support device, particularly for installation in a vehicle, for temporarily holding movable articles especially cellular telephones, including a base body with a support plate and at least one magnet for holding an article on the support plate.

Such a support device is known for example from DE 198 00 174 A1 (U.S. Ser. No. 09/045916). The known support device utilizes the fact that most cellular phones include some magnetic material at their backside. It is therefore possible to hold a cellular or mobile telephone on the support surface of the support device by the attraction forces of the magnet. If the cellular telephone does not include any magnetic material at its backside, a self-adhesive sheet metal plate may be attached to the backside of the cellular telephone whereby the telephone can be held on the support device also in this case.

Although the known device operates reliably, it is noted that many cellular phones are now provided with a protective box-like cover. The protective covers are usually provided at their backsides with a strap by way of which the cover with the phone can be attached to a belt. However, if enclosed by such a protective cover the backside of the phone does not come in direct contact with the support plate of the support device such that the magnetic attraction forces effective on the cellular phone are insufficient to ensure the holding of the phone on the support device.

It is the object of the present invention to provide a support device for holding a cellular telephone in such a way that also a telephone disposed in such a protective cover is firmly supported on the support device.

SUMMARY OF THE INVENTION

In a support device for temporarily supporting an article, particularly a cellular telephone, which includes a base body with a support plate and a magnet disposed below the support plate for retaining articles on the support plate, a pivotable bracket is mounted on the base body so as to be inwardly and outwardly pivotable and the bracket includes an arm which extends over the support plate in parallel-spaced relationship therefrom when the bracket is in the outwardly pivoted end position.

With the support device according to the invention also a cellular telephone disposed in a protective cover can be firmly held on the support device by way of the strap with which the protective cover is provided. The leg of the bracket only needs to be inserted behind the strap to hold the phone. When the leg is inserted behind the strap, the protective cover is held onto the support device in the same way as it is supported for example on a belt. With the pivotable bracket, the support device according to the invention can be easily adapted for supporting the protective cover of a cellular telephone with the telephone disposed in the protective cover. When the bracket is pivoted back onto the body of the support device, it is hardly noticeable and the cellular telephone without protective cover can be held onto the support device by the magnetic forces.

In a particular embodiment of the invention, the bracket is slightly bent such that the strap of the protective cover of the telephone is retained more securely. In this way, the strap is not unintentionally released so that the protective cover with the telephone is more safely held in position.

It is particularly advantageous if the bracket has a first recess which is preferably somewhat wider than the width of the strap so that the arm of the bracket can be inserted behind the strap with an arresting effect. With the strap received in the recess, the protective cover is firmly retained and will not unintentionally slide off the arm of the bracket.

It is very advantageous if the arm of the bracket has a second recess of a semicircular shape which extends further into arm from the center of the first recess. In this second recess, a rivet-like mounting clip present in many protective covers can be accommodated. In this way, the protective cover is even more firmly engaged with the bracket since the second recess has a second arresting effect.

In another embodiment of the invention, a stop is provided whereby the pivoting range of the bracket is limited to 90°. With the stop, the bracket can be pivoted in a simple manner to a position which is optimal for supporting the protective cover. In still another advantageous embodiment, the bracket includes an embossing by which the bracket is engaged and held in its outwardly pivoted and position. In this way, unintended pivoting of the bracket out of its outward end position is avoided.

Preferably, the base body includes a bottom plate on which the bracket and the arm of the bracket is disposed when the bracket is in its inwardly pivoted end position. For this purpose, the bottom plate projects from the base body at a side thereof which is parallel to the pivot axis of the bracket. The arm of the bracket abuts the bottom plate projection which forms a stop when the bracket is pivoted fully inwardly. The end wall of the base body is slightly curved and the arm of the bracket is correspondingly curved so that it closely joins the end face of the base body when the bracket is pivoted to its inward end position. As a result, the bracket is not obtrusive and hardly noticeable in its inwardly pivoted end position so that the magnetic holding function is not affected by the bracket.

In a preferred embodiment, the support base includes a support surface of a slide resistant support layer preferably of foamed rubber. With the resilient foamed rubber support layer, a telephone is disposed on the layer practically in a recess: As a result of the magnetic forces, the telephone is pulled somewhat into the resilient support layer, whereby a wall structure is formed around the telephone which retains the telephone firmly in place.

It has been found to be particularly advantageous if the bottom plate includes cutouts for receiving engagement members for supporting the support device. The support device can then be easily mounted for example onto a plate which has retaining member arranged thereon so as to be received in the openings and engaging the support device. The support device can therefore easily be mounted at most anyplace in a motor vehicle for example.

Other features and advantages of the device according to the invention will become apparent from the following description thereof on the basis of the accompanying drawing.

DESCRIPTION OF A PREFERRED EMBODIMENT

Figure 1:
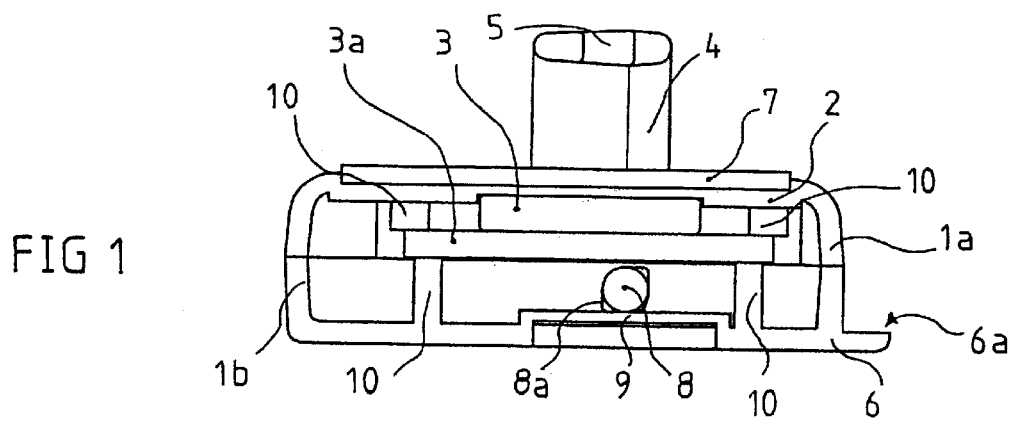
FIG. 1 shows, in a cross-sectional view, a support device according to the invention.
Figure 2:
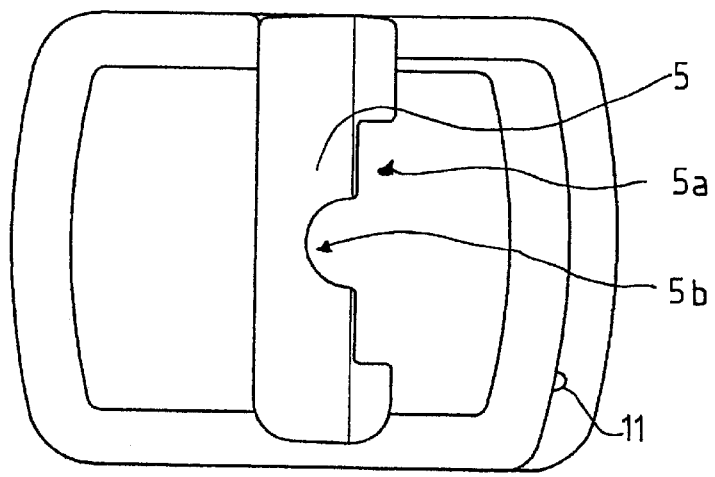
FIG. 2 is a top view of the support device shown in FIG. 1.
Figure 3:
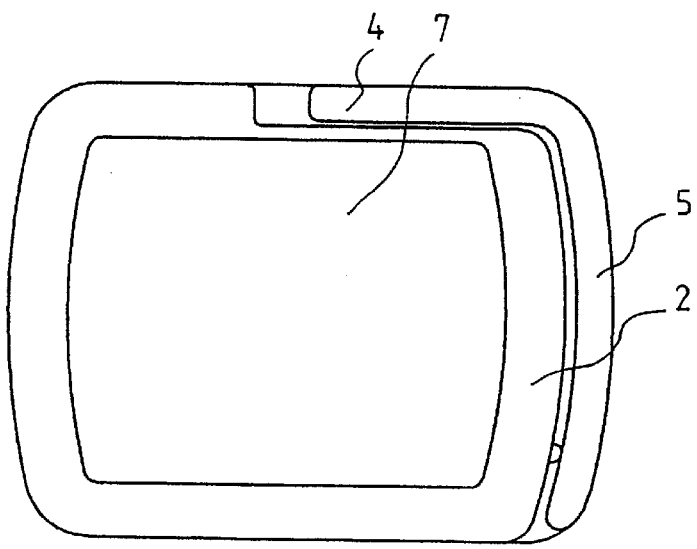
FIG. 3 is a top view of the support device as shown in FIG. 1, wherein however the bracket is in an inwardly pivoted end position.

As shown in the figures, the support device includes a base body 1a, 1b consisting of an upper part 1a and a lower part 1b. The upper part 1a is engaged with the lower part 1b by detent elements which project from one and engage the other of the body parts 1a and 1b. Such engagement structures are known and are therefore not shown in the drawings for clarity reasons. The upper part 1a includes a support plate 2 with a recess in which a foamed rubber support pad 7 is disposed. At its side adjacent the lower part 1b, the support plate includes another recess in which a permanent magnet 3 is partially received. The permanent magnet 3 is disposed on an iron plate 3a, which is clamped in position between webs 10, which are arranged on the upper and the lower parts.

The lower part 1b includes a sleeve-like structure through which a pivot shaft 8 extends. The pivot axis 8 is connected to a leg 4 of a rectangularly bent bracket 4, 5. Angled away from the leg 4 is an arm 5, which extends parallel to the support plate 2 at a distance therefrom of about 1 cm when the bracket is pivoted to its outer end position. The arm 5 includes a first recess 5a having a width of about 25 millimeter and a depth of about 3 mm. In addition, the arm 4 includes an additional recess 5b which is semicircular and is disposed about in the center of the first recess 5a. The lower part 1b includes a bottom plate 6, which is provided, at a side extending parallel to the pivot axis 9, with an area 6a that projects beyond the base body 1a, 1b. The bottom plate 6 includes further a spring element 9, which biases against an area of the pivot shaft 8. The pivot shaft 8 has, in the area adjacent the spring element 9, projections which, in connection with the spring element 9, hold the pivot shaft 8 in pre-determined angular positions such that the bracket is arrested in its inwardly and outwardly pivoted end positions.

The arm 5 of the bracket 4, 5 is slightly curved. The base body 1a, 1b and the bracket 4, 5 are so designed that the arm 5 of the bracket 4, 5 is disposed on the projecting area 6a of the bottom plate 6, when the bracket 4, 5 is in its inwardly pivoted end position. In this position, the bracket is out of the way and is hardly noticeably as it conforms to the shape of the support device body. The lower part 1b also includes a projection 11 on which the arm 5 of the bracket 4, 5 is disposed when it is in its inwardly pivoted end position so that the arm 5 is safely supported and not subject to vibrations.

At the bottom side of the lower part 1b mounting means are provided which include for example openings for engaging the support device with a support structure. Alternatively, a self-adhesive pad may be disposed on the bottom surface for attachment of the support device to a surface.

What is claimed is:

1. A support device for temporarily supporting movable articles, particularly a cellular telephone, said support device including a base body with a support plate having a curved end, a magnet disposed below said support plate for retaining articles on said support plate and a pivotable bracket mounted on said base body and having an arm so formed and arranged that said arm is wrapped around, and disposed closely adjacent, said curved end of said base body when said bracket is in an inwardly pivoted end position and that said arm is disposed above, and extends parallel to, said support plate when said bracket is in an outwardly pivoted end position.

2. A support device according to claim 1, wherein said arm has a recessed area extending over a major part of the length of said arm.

3. A support device according to claim 2, wherein said arm has another recess formed in the center of said recessed area.

4. A support device according to claim 1, wherein stops are provided for limiting pivot movement of said bracket to 90°.

5. A support device according to claim 1, wherein said base body includes a bottom plate with a projection on which said arm is disposed when said bracket is in the inwardly pivoted end position of said bracket.

6. A support device according to claim 5, wherein said bottom plate includes openings for receiving engagement means for holding said support device on a support structure.

7. A support device according to claim 1, wherein said bracket is provided with a retaining structure for engaging said bracket in the outwardly pivoted end position of said bracket.

8. A support device according to claim 1, wherein said support plate includes a slide resistant surface area.

9. A support device according to claim 8, wherein said slide resistant surface area is formed by a foamed rubber pad.

\* \* \* \* \*